United States Patent
Yu

(10) Patent No.: US 9,686,683 B2
(45) Date of Patent: Jun. 20, 2017

(54) METHOD AND SYSTEM FOR SECURE TRANSMISSION OF SMALL DATA OF MTC DEVICE GROUP

(71) Applicant: ZTE Corporation, Shenzhen (CN)

(72) Inventor: Wantao Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/039,359

(22) PCT Filed: Apr. 18, 2014

(86) PCT No.: PCT/CN2014/075724
§ 371 (c)(1),
(2) Date: May 25, 2016

(87) PCT Pub. No.: WO2014/183535
PCT Pub. Date: Nov. 20, 2014

(65) Prior Publication Data
US 2017/0041782 A1    Feb. 9, 2017

(30) Foreign Application Priority Data
Nov. 25, 2013    (CN) .......................... 2013 1 0604096

(51) Int. Cl.
*H04M 1/66*    (2006.01)
*H04W 12/06*    (2009.01)
(Continued)

(52) U.S. Cl.
CPC ........... *H04W 12/06* (2013.01); *H04W 4/005* (2013.01); *H04W 12/04* (2013.01); *H04L 2463/061* (2013.01)

(58) Field of Classification Search
CPC ..... H04W 4/005; H04W 12/06; H04W 12/04; H04W 28/0215; H04W 4/08;
(Continued)

(56) References Cited

U.S. PATENT DOCUMENTS

2010/0268937 A1* 10/2010 Blom .................... H04L 63/061
713/153
2014/0349614 A1* 11/2014 Starsinic ............. H04L 63/0876
455/411
(Continued)

FOREIGN PATENT DOCUMENTS

CN             1878169 A       12/2006
CN           102469455 A        5/2012
(Continued)

OTHER PUBLICATIONS

International Search Report in international application No. PCT/CN2014/075724, mailed on Sep. 3, 2014.
(Continued)

*Primary Examiner* — Timothy Pham
(74) *Attorney, Agent, or Firm* — Oppedahl Patent Law Firm LLC

(57) ABSTRACT

Disclosed is a method for secure transmission of small data of a machine type communication (MTC) device group, comprising a process wherein an MTC device and an MTC-Interworking Function (MTC-IWF) generate a shared key KIWF on the basis of a GBA procedure, the MTC device and a bootstrapping server (BSF) performing AKA authentication: a home subscriber server (HSS) determines whether the MTC device belongs to the MTC device group and whether said device has small data transmission and reception capabilities; if said device belongs to said group and has said capabilities, an AKA authentication vector generated on the basis of the MTC device group key is sent to said BSF; the BSF carries out AKA authentication with the MTC
(Continued)

device on the basis of the received AKA authentication vector. Also disclosed is a system for secure transmission of small data of an MTC device group.

8 Claims, 5 Drawing Sheets

(51) Int. Cl.
*H04W 12/04* (2009.01)
*H04W 4/00* (2009.01)

(58) Field of Classification Search
CPC ....... H04L 63/061; H04L 9/0822; H04L 9/32; H04L 9/0844; G06F 9/4401; G06F 21/445; G06F 21/57
See application file for complete search history.

(56) References Cited

U.S. PATENT DOCUMENTS

| | | | |
|---|---|---|---|
| 2014/0351592 A1* | 11/2014 | Starsinic | H04L 63/0876 713/168 |
| 2015/0012744 A1 | 1/2015 | Chen | |
| 2016/0085561 A1* | 3/2016 | Starsinic | H04W 4/005 713/2 |

FOREIGN PATENT DOCUMENTS

| | | |
|---|---|---|
| CN | 102572818 A | 7/2012 |
| WO | 2013113162 A1 | 8/2013 |

OTHER PUBLICATIONS

English Translation of the Written Opinion of the International Search Authority in international application No. PCT/CN2014/075724, mailed on Sep. 3, 2014.

Wujun Zhang et al: "End-to-End Security Scheme for Machine Type Communication Based on Generic Authentication Architecture",Intelligent Networking and Collaborative Systems (INCOS), 2012 4th International Conference on, IEEE,Sep. 19, 2012 (Sep. 19, 2012), pp. 353-359, XP032266073, DOI: 10.1109/INC0S.2012.79 ISBN: 978-1-4673-2279-9,mailed on Sep. 19, 2012.

ZTE Corporation: "pCR to MTC Group Identifier",3GPP Draft; PCR to MTC Group Identifier, 3rd Generation Partnership Project (3GPP), Mobile Competence Centre ; 650, Route Des Lucioles ; F-Q6921 Sophia-Antipolis Cedex-Prance vol. SA WG3, No. Chengdu; Apr. 11, 2011,Apr. 2, 2011 (Apr. 2, 2011), XP050526621,mailed on Apr. 2, 2011.

Supplementary European Search Report in European application No. 14797273.1, mailed on Oct. 19, 2016.

NEC Corporation: "pCR: Modification to MTC-IWF based security solution for small data transmission", 3GPP Draft: S3-130861, 3rd Generationpartnership Project (3GPP), Mobile Competence Centre; 650, Route Des Lucioles; F-06921 Sophia-Antipolis Cedex; France, vol. SA WG3, No. Qingdao; Jul. 8-12, 2013, XP050727222, Retrieved from the Internet: URL: http://www.3gpp.org/ftp/tsg_sa/WG3_Sec urity/TSGS3_72_Qingdao/Docs/[retrieved on Jul. 12, 2013], mailed on Jul. 12, 2013.

* cited by examiner

METHOD AND SYSTEM FOR SECURE TRANSMISSION OF SMALL DATA OF MTC DEVICE GROUP

TECHNICAL FIELD

The disclosure relates to a Generic Bootstrapping Architecture (GBA) key agreement technology, and in particular to a secure Small Data Transmission (SDT) method and system for a Machine Type Communication (MTC) device group.

BACKGROUND

MTC refers to a generic term of a series of technologies and combinations thereof for implementing data communication and exchange between a machine and a machine and between a machine and a man by virtue of a wireless communication technology. MTC has two meanings: the first is a machine, which is called an intelligent device in the field of intelligence; and the second is a connection between a machine and a machine, the machines being connected through a network. MTC is widely applied to, for example, intelligent measurement and remote monitoring, and makes the life of people more intelligent. Compared with conventional interpersonal communication, MTC has the advantages of numerous MTC devices, wide application range and broad market prospect.

In an existing MTC system, an MTC device communicates with a service server such as an MTC server through a 3rd Generation Partnership Project (3GPP) network and an MTC Interworking Function (MTC-IWF).

A GBA defines a generic key agreement mechanism between a terminal and a server.

After introduction of MTC devices, there are numerous MTC devices in a mobile communication system, so that it is necessary to perform management optimization on the MTC devices in groups to reduce a network load and save network resources. Moreover, these MTC devices may frequently send small data, thereby reducing efficiency of the mobile communication system. In order to efficiently utilize the network resources, it is necessary to enhance and optimize the mobile communication system according to SDT to improve SDT efficiency of the mobile communication system. Transmitting small data between an MTC device and each of an MTC-IWF and a service server through signalling is a very effective manner, may avoid allocation of user plane resources, and may also reduce utilization of radio resources. In addition, during SDT for the condition of MTC device groups, it is necessary to perform security control and management on MTC devices in groups.

At present, an SDT protocol is introduced into a method for transmitting small data between an MTC device and each of an IWF and a service server through signalling, and is deployed in the MTC device and the MTC-IWF. Any piece of data is required to pass through the MTC-IWF for exchange between the MTC device and the service server. In the method, for ensuring security of data transmission between the MTC device and the MTC-IWF, it is necessary to create a shared key between the MTC device and the MTC-IWF. An existing solution is to create a key configured to protect secure SDT in the MTC-IWF through an Authentication and Key Agreement (AKA) process in an attachment process. In such a manner, in the same attachment process, the MTC device may perform secure SDT for many times by adopting the same small data transmission protection key. Using the same SDT protection key for multiple SDT processes increases a risk of attack to the SDT protection key. In addition, during a practical Machine-to-Machine (M2M) application, an MTC device may be required to initiate SDT for different destination servers in an attachment process, and for ensuring security, SDT for these different destination servers is required to be protected by different keys. Therefore, it is necessary to create a shared key configured to protect secure SDT between the MTC device and an MTC-IWF for each SDT process during SDT of the MTC device. For the condition of an MTC device group, it is necessary to create a shared key between a group of MTC devices and the MTC-IWF during each SDT of the MTC device group. How to create a shared key configured to protect secure SDT between a group of MTC devices and an MTC-IWF for each SDT is a technical problem urgent to be solved.

SUMMARY

In order to solve the existing technical problem, the embodiment of the disclosure provides an SDT method and system for an MTC device group.

The embodiment of the disclosure provides an SDT method for an MTC device group, which may include a process that an MTC device and an MTC-IWF generate a Ishared key $K_{IWF}$ on the basis of a GBA key agreement process in which AKA authentication between the MTC device and a Bootstrapping Server Function (BSF) includes:

a Home Subscriber Server (HSS) determines whether the MTC device belongs to the MTC device group and has a small data sending and receiving capability or not, and if YES, sends an AKA authentication vector generated on the basis of an MTC device group key to the BSF; and the BSF performs AKA authentication with the MTC device according to the received AKA authentication vector.

In an embodiment, the method may further include: after the AKA authentication between the BSF and the MTC device succeeds, the MTC device and the BSF generate a root key Ks; and
the MTC device, the BSF and the MTC-IWF generate $K_{IWF}$ on the basis of the root key Ks in the GBA key agreement process.

In an embodiment, the method may further include: before the AKA authentication between the MTC device and the BSF, the MTC device sends, to the BSF, an initialization request carrying MTC device identification information, MTC device SDT capability information and MTC device group identification information;

after receiving the initialization request from the MTC device, the BSF sends, to the HSS, a retrieval request carrying the MTC device identification information and the MTC device group identification information; and the HSS determines whether the MTC device belongs to the MTC device group or not according to the MTC device identification information and the MTC device group identification information.

In an embodiment, the method may further include: after generation of $K_{IWF}$, data transmission is performed between the MTC device and the MTC-IWF according to $K_{IWF}$.

In an embodiment, the step that the HSS determines whether the MTC device belongs to the MTC device group or not may specifically include:

the HSS determines whether the MTC device belongs to the MTC device group or not according to the MTC device identification information and the MTC device group identification information.

In an embodiment, the step that the HSS determines whether the MTC device has the small data sending and receiving capability or not may specifically include:

the HSS determines whether the MTC device has the small data sending and receiving capability or not according to the MTC device SDT capability information.

In an embodiment, the step that the HSS determines whether the MTC device has the small data sending and receiving capability or not may specifically include:

the HSS determines whether the MTC device has the small data sending and receiving capability or not according to stored subscription information, the subscription information including the MTC device SDT capability information.

In an embodiment, the method may further include: after the step that $K_{IWF}$ is generated on the basis of the root key Ks, the MTC device and the BSF generate a data encryption key and/or a data integrity protection key on the basis of $K_{IWF}$, and send the data encryption key and/or data integrity protection key to the MTC-IWF.

In an embodiment, the method may further include: after the HSS determines that the MTC device belongs to the MTC device group according to the MTC device identification information and the MTC device group identification information, the HSS generates user security configuration information according to the MTC device identification information and the MTC device group identification information.

The embodiment of the disclosure provides a secure SDT method for an MTC device group, including:

after at least one MTC device in the MTC device group creates a shared key $K_{IWF}$ according to the method of the embodiment of the disclosure, in a GBA key agreement process between a further MTC device and an MTC-IWF:

a BSF performs AKA vector authentication with the further MTC device according to a recently adopted authentication vector corresponding to an MTC device group identifier after determining that there is $K_{IWF}$ being used according to MTC device group identification information and user security configuration information, and after authentication succeeds, the further MTC device and the BSF generate a root key Ks; and the further MTC device, the BSF and the MTC-IWF generate $K_{IWF}$ on the basis of the root key Ks in the GBA key agreement process.

The embodiment of the disclosure provides a secure SDT method for an MTC device group, including:

after at least one MTC device in the MTC device group creates a shared key $K_{IWF}$ according to a method of the embodiment of the disclosure and generates user security configuration information according to a method of the embodiment of the disclosure, in a GBA key agreement process between a further MTC device and an MTC-IWF:

a BSF performs AKA vector authentication with the further MTC device according to a recently adopted authentication vector corresponding to an MTC device group identifier after determining that there is a data encryption key and/or data integrity protection key being used according to MTC device group identification information and the user security configuration information, and after authentication succeeds, the further MTC device and the BSF generate a root key Ks; and the further MTC device, the BSF and the MTC-IWF generate $K_{IWF}$ on the basis of the root key Ks in the GBA key agreement process.

The embodiment of the disclosure provides a secure SDT system for an MTC device group, which may be applied to AKA authentication between an MTC device in the MTC device group and a BSF, including the MTC device, the BSF and an HSS, in which:

the HSS is configured to, after determining that the MTC device belongs to the MTC device group and has a small data sending and receiving capability, send an AKA authentication vector generated on the basis of an MTC device group key to the BSF; and the BSF is configured to perform AKA authentication with the MTC device according to the received AKA authentication vector.

In an embodiment, the MTC device and the BSF may further be configured to generate a root key Ks after the AKA authentication between the BSF and the MTC device succeeds; and the MTC device, the BSF and an MTC-IWF generate the shared key $K_{IWF}$ on the basis of the root key Ks in a GBA key agreement process.

In an embodiment, before the AKA authentication between the MTC device and the BSF:

the MTC device may further be configured to send, to the BSF, an initialization request carrying MTC device identification information, MTC device SDT capability information and MTC device group identification information;

the BSF may further be configured to, after receiving the initialization request from the MTC device, send, to the HSS, a retrieval request carrying the MTC device identification information, MTC device SDT capability information and the MTC device group identification information; and the HSS may further be configured to determine whether the MTC device belongs to the MTC device group or not according to the MTC device identification information and the MTC device group identification information.

In an embodiment, after $K_{IWF}$ is generated on the basis of the root key Ks:

the MTC device and the BSF may further be configured to generate a data encryption key and a data integrity protection key on the basis of $K_{IWF}$, and send the data encryption key and/or data integrity protection key to the MTC-IWF.

the HSS may further be configured to generate user security configuration information according to the MTC device identification information and the MTC device group identification information.

In an embodiment, after $K_{IWF}$ is generated on the basis of the root key Ks:

the MTC device and the BSF may further be configured to generate the data encryption key and/or the data integrity protection key on the basis of $K_{IWF}$, and send the data encryption key and/or data integrity protection key to the MTC-IWF.

The embodiment of the disclosure provides a secure SDT system for an MTC device group, which may be applied to a GBA key agreement process between a further MTC device and an MTC-IWF after at least one MTC device in the MTC device group creates a shared key $K_{IWF}$ according to a system of the embodiment of the disclosure, including the MTC device, a BSF and the MTC-IWF, in which:

the BSF may be configured to perform AKA vector authentication with the MTC device according to a recently adopted authentication vector corresponding to an MTC device group identifier after determining that there is a data encryption key and data integrity protection key being used according to MTC device group identification information and user security configuration information, and after authentication succeeds, the MTC device and the BSF generate a root key Ks; and the MTC device, the BSF and the MTC-IWF may be configured to generate $K_{IWF}$ on the basis of the root key Ks in the GBA key agreement process.

The embodiment of the disclosure provides a secure SDT system for an MTC device group, which may be applied to a GBA key agreement process between a further MTC device and an MTC-IWF after at least one MTC device in the MTC device group creates a shared key $K_{IWF}$ according to a system of the embodiment of the disclosure, including the MTC device, a BSF and the MTC-IWF, wherein the BSF may be configured to perform AKA vector authentication with the further MTC device according to a recently adopted authentication vector corresponding to an MTC device group identifier after determining that there is a data encryption key and/or data integrity protection key being used according to MTC device group identification information and user security configuration information, and after authentication succeeds, the further MTC device and the BSF generate a root key Ks; and the MTC device, the BSF and the MTC-IWF may be configured to generate $K_{IWF}$ on the basis of the root key Ks in the GBA key agreement process.

The embodiment of the disclosure provides an MTC device group, which may include:

a storage module, configured to store MTC device identification information and MTC device group identification information;

an initialization request sending module, configured to send, to a BSF, an initialization request carrying the MTC device identification information, MTC device SDT capability information and the MTC device group identification information;

a first AKA authentication module, configured to perform AKA authentication with the BSF according to an AKA authentication vector, the AKA authentication vector being generated by an HSS on the basis of an MTC device group key;

a first root key generation module, configured to, after the AKA authentication with the BSF succeeds, generate a root key Ks with the BSF; and a first key agreement module, configured to perform GBA key agreement with the BSF and an MTC-IWF.

The embodiment of the disclosure provides a BSF, including:

a first receiving module, configured to receive an initialization request from an MTC device, the initialization request carrying MTC device identification information MTC device SDT capability information and MTC device group identification information;

a retrieval request sending module configured to, after receiving the initialization request from the MTC, send, to an HSS, a retrieval request carrying the MTC device identification information, MTC device SDT capability information and the MTC device group identification information;

a second AKA authentication module, configured to perform AKA authentication with the MTC device according to an AKA authentication vector, the AKA authentication vector being generated by the HSS on the basis of an MTC device group key;

a second root key generation module, configured to, after the AKA authentication with the MTC device succeeds, generate a root key Ks with the MTC device; and a second key agreement module, configured to perform GBA key agreement with the MTC device and an MTC-IWF.

The embodiment of the disclosure provides an HSS, including:

a second receiving module, configured to receive a retrieval request from a BSF, the retrieval request carrying MTC device identification information, MTC device SDT capability information and MTC device group identification information;

a determination module, configured to determine whether an MTC device belongs to an MTC device group and has a small data sending and receiving capability or not;

an authentication vector generation module, configured to, after the determination module determines that the MTC device belongs to the MTC device group and has the small data sending and receiving capability, generate an AKA authentication vector on the basis of an MTC device group key; and an authentication vector sending module, configured to send the generated AKA authentication vector to the BSF.

The embodiment of the disclosure provides a BSF, including:

a first receiving module, configured to receive an initialization request from an MTC device, the initialization request carrying MTC device identification information MTC device SDT capability information and MTC device group identification information;

a first determination module, configured to determine whether there is a shared key $K_{IWF}$ being used or not according to the MTC device group identification information and user security configuration information;

a second AKA authentication module, configured to perform AKA vector authentication with the MTC device according to a recently adopted authentication vector corresponding to an MTC device group identifier;

a second root key generation module, configured to, after AKA authentication with the MTC device succeeds, generate a root key Ks with the MTC device; and a second key agreement module, configured to perform GBA key agreement with the MTC device and an MTC-IWF.

The embodiment of the disclosure provides a BSF, including:

a first receiving module, configured to receive an initialization request from an MTC device, the initialization request carrying MTC device identification information MTC device SDT capability information and MTC device group identification information;

a second determination module, configured to determine whether there is a data encryption key and/or data integrity protection key being used or not according to the MTC device group identification information and user security configuration information;

a second AKA authentication module, configured to perform AKA vector authentication with the MTC device according to a recently adopted authentication vector corresponding to an MTC device group identifier;

a second root key generation module, configured to, after AKA authentication with the MTC device succeeds, generate a root key Ks with the MTC device; and a second key agreement module, configured to perform GBA key agreement with the MTC device and an MTC-IWF.

Compared with a conventional art, the method and system of the embodiment of the disclosure have the advantage that a technical problem about SDT between the MTC device in the MTC device group and the MTC-IWF is solved. In such a manner, for each SDT, any MTC device in the MTC device group may establish a secure SDT channel with the MTC-IWF according to the MTC device group information.

DETAILED DESCRIPTION

The disclosure will be described below with reference to the drawings and embodiments in detail. It is important to note that the embodiments in the disclosure and characteristics in the embodiments may be combined under the condition of no conflicts.

Figure 1:
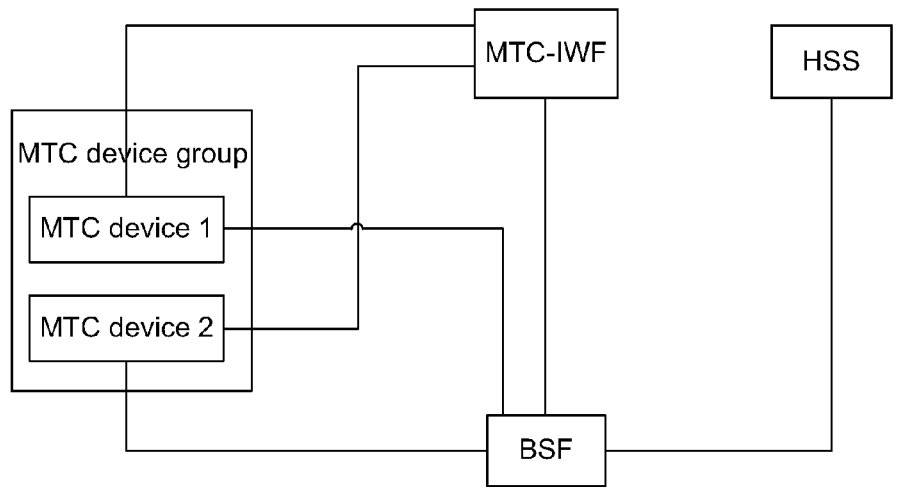
FIG. 1 is a diagram of an MTC device group-based secure SDT system according to an embodiment of the disclosure.

As shown in FIG. 1, a secure SDT system for an MTC device group in the disclosure includes: the MTC device group and a device in the MTC device group, the MTC device being configured to store MTC device group information and information about a shared key for SDT; a BSF, configured to perform a GBA key agreement process and store and maintain MTC user security configuration information; an HSS, configured to manage and maintain MTC device information and MTC device group information, generate the MTC user security configuration information and generate an AKA authentication vector on the basis of an MTC device group key; and an MTC-IWF, configured to implement a Network Attached Storage (NAS) server function, and store the MTC user security configuration information and the information about the shared key for SDT.

Embodiment 1

Figure 2:
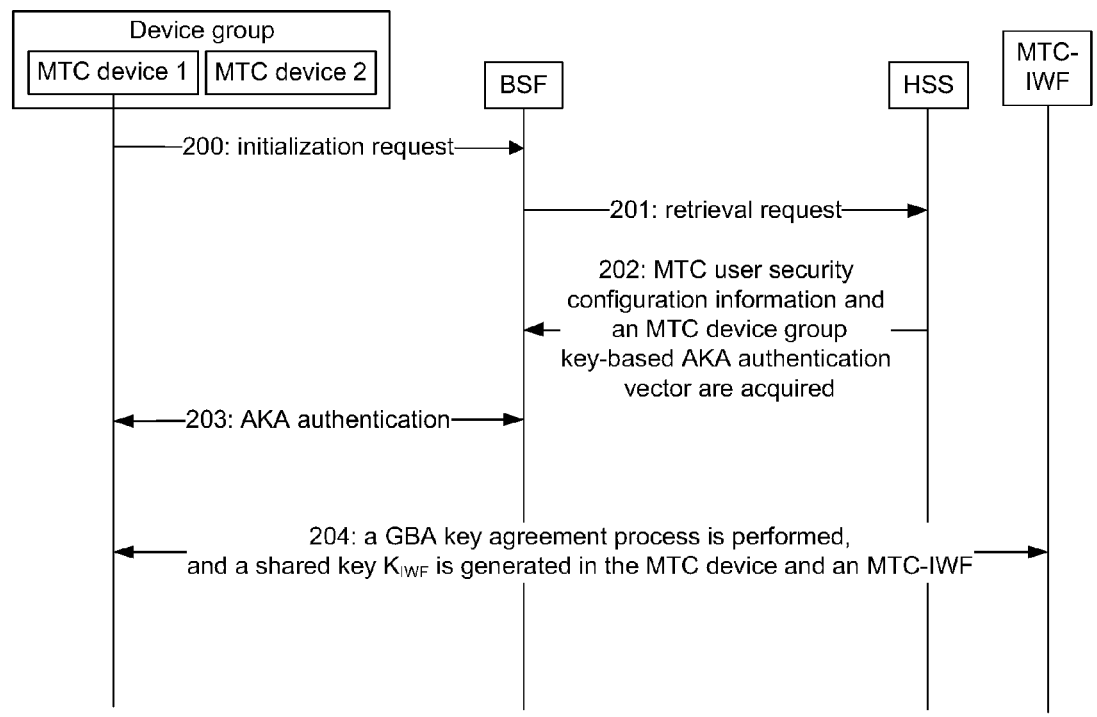
FIG. 2 is a flowchart of an MTC device group-based shared key creation method for secure SDT according to embodiment 1 of the disclosure.

In embodiment 1, an MTC device creates a shared key $K_{IWF}$ with an MTC-IWF when being required to perform SDT, as shown in FIG. 2, specifically including the following steps.

Step 200: the MTC device (MTC device 1 in an MTC device group shown in FIG. 2) sends an initialization request to a BSF, the initialization request including MTC device identification information, for example, an International Mobile Subscriber Identity (IMSI), and further including MTC device group identification information and small data sending/receiving capability information of the MTC device.

Step 201: the BSF sends a retrieval request to an HSS, the retrieval request including the MTC device identification information and the MTC device group identification information and further including the small data sending/receiving capability information of the MTC device.

Step 202: the BSF gets back, MTC user security configuration information and an AKA authentication vector generated on the basis of an MTC device group key, from the HSS according to the MTC device group identification information, that is, the HSS sends the MTC user security configuration information and the AKA authentication vector generated on the basis of the MTC device group key to the BSF.

The HSS checks the MTC device identification information and MTC device group identification information in the retrieval request according to stored MTC device information and MTC device group information at first, and when it is determined that the MTC device belongs to the MTC device group, the HSS sends the MTC user security configuration information and the AKA authentication vector generated on the basis of the MTC device group key to the BSF; and in addition, when the HSS checks the MTC device identification information and MTC device group identification information in the retrieval request and after it is determined that the MTC device belongs to the MTC device group, the HSS may further check an SDT capability of the MTC device, for example, check a small data sending/receiving capability of the MTC device according to subscription information of the MTC device, to determine whether to send the MTC user security configuration information and the AKA authentication vector generated on the basis of the MTC device group key to the BSF or not.

Step 203: the BSF stores the received MTC user security configuration information and the received AKA authentication vector, and performs an AKA authentication process with the MTC device according to the received AKA authentication vector, and after the AKA authentication process is ended, the MTC device and the BSF generate a GBA root key Ks.

Step 204: the MTC device, an MTC-IWF and the BSF perform a GBA key agreement process, and the shared key $K_{IWF}$ configured to protect SDT is generated between the MTC device and the MTC-IWF on the basis of the GBA root key Ks; and in addition, the BSF sends the MTC user security configuration information to the MTC-IWF for storage in the GBA key agreement process.

Embodiment 2

Figure 3:
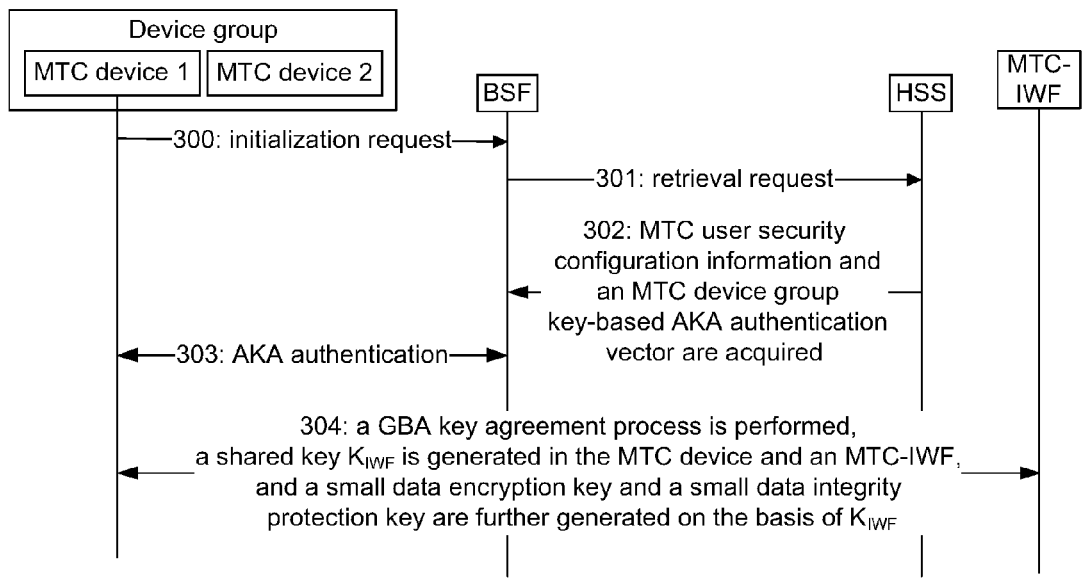
FIG. 3 is a flowchart of an MTC device group-based shared key creation method for secure SDT according to embodiment 2 of the disclosure.

In embodiment 2, an MTC device and an MTC-IWF further generate a small data encryption key and a small data integrity protection key on the basis of creating a shared key $K_{IWF}$, as shown in FIG. 3, specifically including the following steps.

Step 300: the MTC device (MTC device 1 in an MTC device group shown in FIG. 3) sends an initialization request to a BSF, the initialization request including MTC device identification information, for example, an IMSI, and further including MTC device group identification information and small data sending/receiving capability information of the MTC device.

Step 301: the BSF sends a retrieval request to an HSS, the retrieval request including the MTC device identification information and the MTC device group identification information and further including the small data sending/receiving capability information of the MTC device.

Step 302: the BSF gets back, MTC user security configuration information and an AKA authentication vector generated on the basis of an MTC device group key, from the HSS according to the MTC device group identification information, that is, the HSS sends the MTC user security configuration information and the AKA authentication vector generated on the basis of the MTC device group key to the BSF.

The HSS checks the MTC device identification information and MTC device group identification information in the retrieval request according to stored MTC device information and MTC device group information at first, and when it is determined that the MTC device belongs to the MTC device group, the HSS sends the MTC user security configuration information and the AKA authentication vector generated on the basis of the MTC device group key to the BSF; and in addition, when the HSS checks the MTC device identification information and MTC device group identification information in the retrieval request and after it is determined that the MTC device belongs to the MTC device group, the HSS may further check an SDT capability of the MTC device, for example, check a small data sending/receiving capability of the MTC device according to subscription information of the MTC device, to determine whether to send the MTC user security configuration information and the AKA authentication vector generated on the basis of the MTC device group key to the BSF or not.

Step 303: the BSF stores the received MTC user security configuration information and the received AKA authentication vector, and performs an AKA authentication process with the MTC device according to the received AKA authentication vector, and after the AKA authentication process is ended, the MTC device and the BSF generate a GBA root key Ks.

Step 304: the MTC device, the MTC-IWF and the BSF perform a GBA key agreement process, and the shared key $K_{IWF}$ configured to protect SDT is generated between the MTC device and the MTC-IWF on the basis of the GBA root key Ks. When generating $K_{IWF}$, the BSF may further generate a next-level key, for example, an encryption key and an integrity protection key, configured to protect secure SDT through $K_{IWF}$ according to a system requirement or an SDT security protection requirement, and then sends generated key information to the MTC-IWF for storage. In addition, the BSF sends the MTC user security configuration information to the MTC-IWF for storage in the GBA key agreement process. When generating $K_{IWF}$, the MTC device may further generate the next-level key, such as the encryption key and the integrity protection key, configured to protect secure SDT through $K_{IWF}$ according to the system requirement or the SDT security protection requirement.

Embodiment 3

Figure 4:
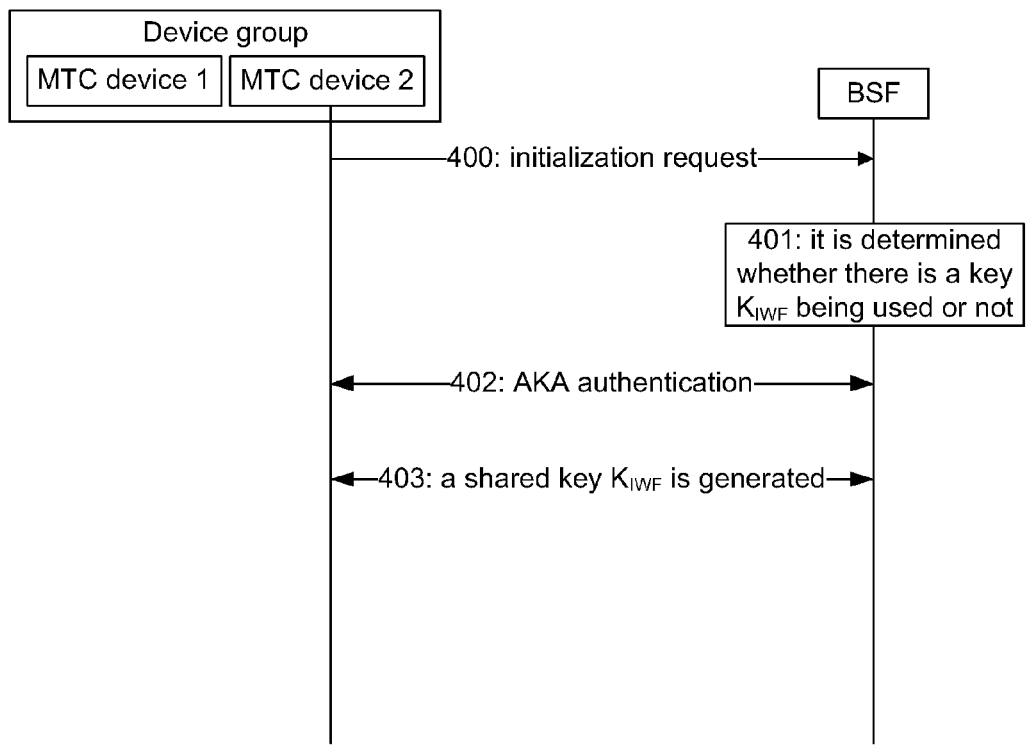
FIG. 4 is an MTC device group-based shared key creation method for secure SDT according to embodiment 3 of the disclosure.

In embodiment 3, a further MTC device in an MTC device group creates a shared key $K_{IWF}$ with an MTC-IWF when being required to perform SDT, as shown in FIG. 4, specifically including the following steps.

Step 400: the MTC device (MTC device 2 in the MTC device group shown in FIG. 4) sends an initialization request to a BSF, the initialization request including MTC device identification information, for example, an IMSI, and further including MTC device group identification information and small data sending/receiving capability information of the MTC device.

Step 401: the BSF determines whether there is a key $K_{IWF}$ being used or not according to the MTC device group identification information in the initialization request of the MTC device and MTC user security configuration information stored in the BSF.

Step 402: if it is determined that there is a key $K_{IWF}$ being used, the BSF directly performs an AKA authentication process with the MTC device according to a recently adopted AKA authentication vector corresponding to an MTC device group identifier, and after the AKA authentication process is ended, the MTC device and the BSF generate a GBA root key Ks.

Step 403: the MTC device further generates the shared key $K_{IWF}$ configured to protect SDT on the basis of the GBA root key Ks.

Embodiment 4

Figure 5:
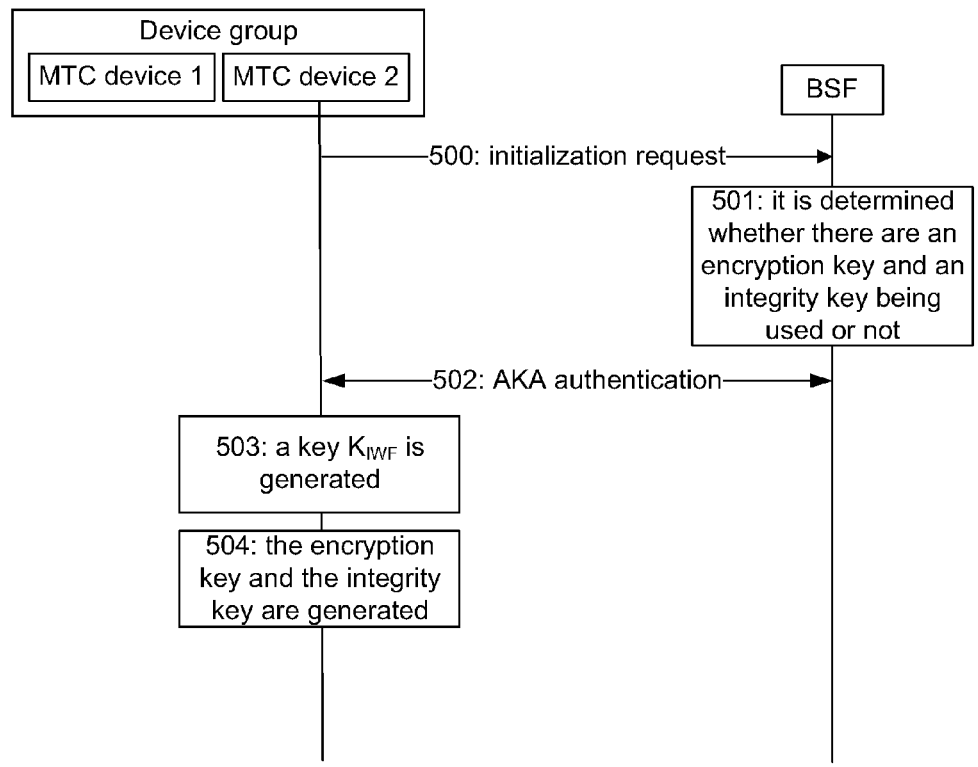
FIG. 5 is a flowchart of an MTC device group-based shared key creation method for secure SDT according to embodiment 4 of the disclosure.

In embodiment 4, when a further MTC device in an MTC device group is required to perform SDT, the MTC device further generates a small data encryption key and a small data integrity protection key which are shared with an MTC-IWF on the basis of a key $K_{IWF}$, as shown in FIG. 5, specifically including the following steps.

Step 500: the MTC device (MTC device 2 in the MTC device group shown in FIG. 5) sends an initialization request to a BSF, the initialization request including MTC device identification information, for example, an IMSI, and further including MTC device group identification information and small data sending/receiving capability information of the MTC device.

Step 501: the BSF determines whether there are an encryption key and an integrity key being used or not according to the MTC device group identification information in the initialization request of the MTC device and MTC user security configuration information stored in the BSF.

Step 502: if it is determined that there are an encryption key and an integrity key being used, the BSF directly performs an AKA authentication process with the MTC device according to a recently adopted AKA authentication vector corresponding to an MTC device group identifier, and after the AKA authentication process is ended, the MTC device and the BSF generate a GBA root key Ks.

Step 503: the MTC device further generates $K_{IWF}$ on the basis of the GBA root key Ks.

Step 504: the MTC device further generates the encryption key and the integrity key which are configured to protect SDT on the basis of $K_{IWF}$.

Embodiment 5

Figure 6:
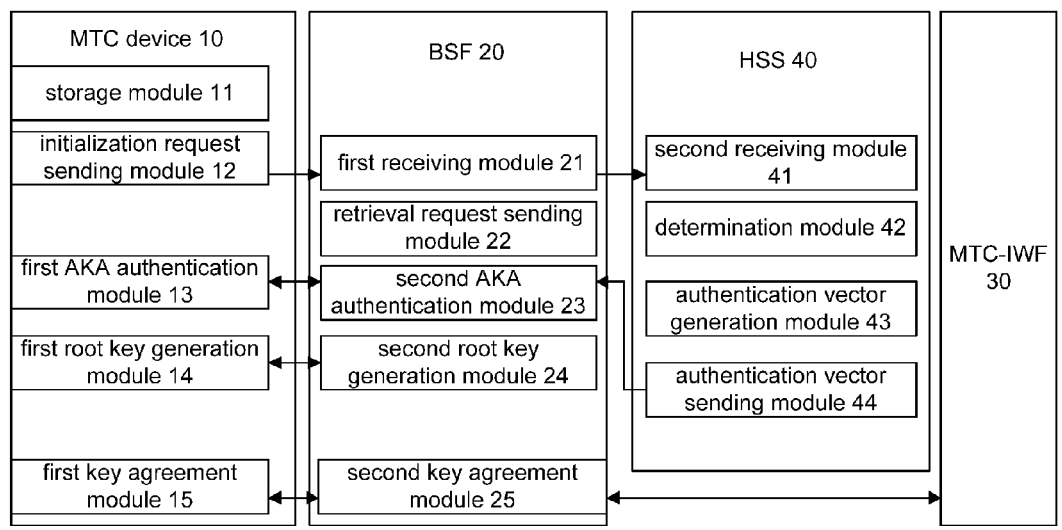
FIG. 6 is a structure block diagram of an MTC device group-based secure SDT system according to embodiment 5 of the disclosure.

The embodiment discloses a security SDT system for an MTC device group, as shown in FIG. 6, including an MTC device 10, a BSF 20, an MTC-IWF 30 and an HSS 40, in which:

the MTC device 10 includes:

a storage module 11, configured to store MTC device identification information and MTC device group information, the MTC device group information including MTC device group identification information and MTC device group key information;

an initialization request sending module 12 configured to send, to the BSF 20, an initialization request carrying the MTC device identification information and the MTC device group identification information;

a first AKA authentication module 13, configured to perform AKA authentication with the BSF 20 according to an AKA authentication vector, the AKA authentication vector being generated by the HSS 40 on the basis of an MTC device group key;

a first root key generation module 14, configured to, after the AKA authentication between the BSF 20 succeeds, generate a root key Ks with the BSF 20; and a first key agreement module 15, configured to perform GBA key agreement with the BSF 20 and the MTC-IWF 30.

The BSF 20 includes:

a first receiving module 21, configured to receive the initialization request from the MTC device 10, the initialization request carrying the MTC device identification information and the MTC device group identification information;

a retrieval request sending module 22 configured to, after receiving the initialization request from the MTC device 10, send, to the HSS 40, a retrieval request carrying the MTC device identification information and the MTC device group identification information;

a second AKA authentication module 23, configured to perform AKA authentication with the MTC device 10 according to the AKA authentication vector, the AKA authentication vector being generated by the HSS 40 on the basis of the MTC device group key;

a second root key generation module 24, configured to, after the AKA authentication with the MTC device 10 succeeds, generate the root key Ks with the MTC device 10; and a second key agreement module 25, configured to perform GBA key agreement with the MTC device 10 and the MTC-IWF 30.

The HSS 40 includes:

a second receiving module 41, configured to receive the retrieval request from the BSF 20, the retrieval request carrying the MTC device identification information and MTC device group identification information;

a determination module 42, configured to determine whether the MTC device 10 belongs to the MTC device group and has a small data sending and receiving capability or not;

an authentication vector generation module 43, configured to, after the determination module 42 determines that the MTC device belongs to the MTC device group and has the small data sending and receiving capability, generate the AKA authentication vector on the basis of the MTC device group key; and an authentication vector sending module 44, configured to send the generated AKA authentication vector to the BSF 20.

Embodiment 6

Figure 7:
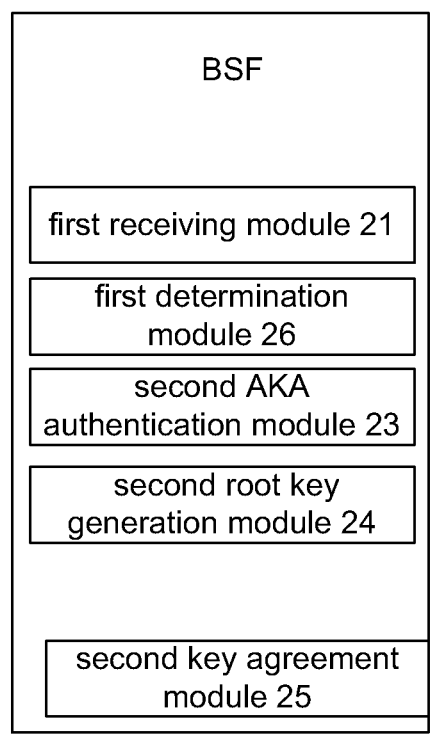
FIG. 7 is a structure block diagram of a BSF according to embodiment 6 of the disclosure.

The embodiment discloses a BSF, as shown in FIG. 7, including:

a first receiving module 21, configured to receive an initialization request from an MTC device, the initialization request carrying MTC device identification information and MTC device group identification information;

a first determination module 26, configured to determine whether there is a shared key $K_{IWF}$ being used or not according to the MTC device group identification information and user security configuration information;

a second AKA authentication module 23, configured to perform AKA vector authentication with the MTC device according to a recently adopted authentication vector corresponding to an MTC device group identifier;

a second root key generation module 24, configured to, after the AKA authentication with the MTC device succeeds, generate a root key Ks with the MTC device; and a second key agreement module 25, configured to perform GBA key agreement with the MTC device and an MTC-IWF.

Embodiment 7

Figure 8:
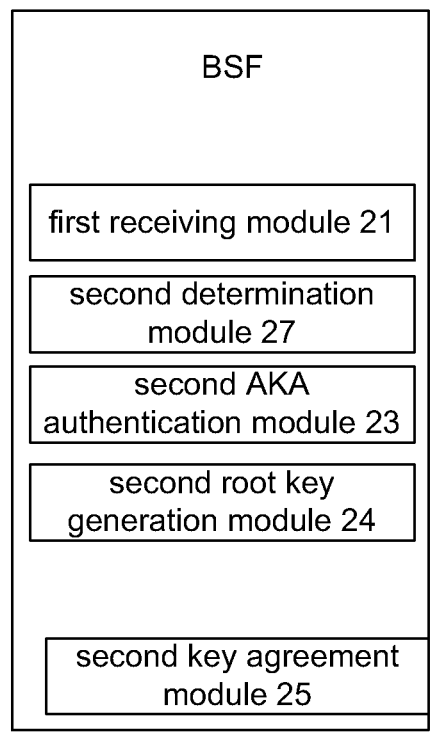
FIG. 8 is a structure block diagram of a BSF according to embodiment 7 of the disclosure.

The embodiment discloses a BSF, as shown in FIG. 8, including:

a first receiving module 21, configured to receive an initialization request from an MTC device, the initialization request carrying MTC device identification information and MTC device group identification information;

a second determination module 27, configured to determine whether there is a data encryption key and/or data integrity protection key being used or not according to the MTC device group identification information and user security configuration information;

a second AKA authentication module 23, configured to perform AKA vector authentication with the MTC device according to a recently adopted authentication vector corresponding to an MTC device group identifier;

a second root key generation module 24, configured to, after the AKA authentication with the MTC device succeeds, generate a root key Ks with the MTC device; and a second key agreement module 25, configured to perform GBA key agreement with the MTC device and an MTC-IWF.

The above are only the preferred embodiments of the disclosure and not intended to limit the scope of protection of the disclosure.

What is claimed is:

1. A secure Small Data Transmission (SDT) method for a Machine Type Communication (MTC) device group, comprising a process of generating, by an MTC device and an MTC Interworking Function (MTC-IWF), a shared key $K_{IWF}$ on the basis of a Generic Bootstrapping Architecture (GBA) key agreement process:

sending, by the MTC device, to a Bootstrapping Server Function (BSF), an initialization request carrying MTC device identification information and MTC device group identification information;

after receiving the initialization request from the MTC device, sending, by the BSF, to a Home Subscriber Server (HSS), a retrieval request carrying the MTC device identification information, MTC device SDT capability information and the MTC device group identification information;

determining, by the HSS, whether the MTC device belongs to the MTC device group or not according to the MTC device identification information and the MTC device group identification information;

when determining that the MTC device belongs to the MTC device;

group, determining, by the HSS, whether the MTC device has a small data sending and receiving capability or not;

when determining that the MTC device belongs to the MTC device group and has the small data sending and receiving capability, sending, by the HSS, user security configuration information and an Authentication and Key Agreement (AKA) authentication vector generated on the basis of an MTC device group key to the BSF; and performing, by the BSF, AKA authentication with the MTC device according to the received AKA authentication vector; and after the AKA authentication between the BSF and the MTC device succeeds, generating, by the MTC device and the BSF, a root key Ks; and generating, by the MTC device, the BSF and the MTC-IWF, $K_{IWF}$ on the basis of the root key Ks in the GBA key agreement process;

wherein the method further comprises:
after at least one MTC device in the MTC device group creates a shared key $K_{IWF}$, in a GBA key agreement process between a further MTC device and the MTC-IWF:
performing, by the BSF, AKA vector authentication with the further MTC device according to a recently adopted authentication vector corresponding to the MTC device group identifier after determining that there is $K_{IWF}$ being used according to the MTC device group identification information and the user security configuration information, and after authentication succeeds, generating, by the further MTC device and the BSF, a root key Ks; and
generating, by the further MTC device, the BSF and the MTC-IWF, $K_{IWF}$ on the basis of the root key Ks in the GBA key agreement process.

2. The method according to claim 1, further comprising:
after generation of $K_{IWF}$,
performing data transmission between the MTC device and the MTC-IWF according to $K_{IWF}$.

3. The method according to claim 2, wherein
determining, by the HSS, whether the MTC device has the small data sending and receiving capability or not specifically comprises:
determining, by the HSS, whether the MTC device has the small data sending and receiving capability or not according to the MTC device SDT capability information.

4. The method according to claim 2, wherein
determining, by the HSS, whether the MTC device has the small data sending and receiving capability or not specifically comprises:
determining, by the HSS, whether the MTC device has the small data sending and receiving capability or not according to stored subscription information, the subscription information comprising the MTC device SDT capability information.

5. The method according to claim 1, further comprising:
after generating $K_{IWF}$ on the basis of the root key Ks, generating, by the MTC device and the BSF, a data encryption key and/or a data integrity protection key on the basis of $K_{IWF}$, and sending the data encryption key and/or data integrity protection key to the MTC-IWF.

6. A secure Small Data Transmission (SDT) method for a Machine Type Communication (MTC) device group, comprising a process of generating, by an MTC device and an MTC Interworking Function (MTC-IWF), a shared key $K_{IWF}$ on the basis of a Generic Bootstrapping Architecture (GBA) key agreement process:
sending, by the MTC device, to a Bootstrapping Server Function (BSF), an initialization request carrying MTC device identification information and MTC device group identification information;
after receiving the initialization request from the MTC device, sending, by the BSF, to a Home Subscriber Server (HSS), a retrieval request carrying the MTC device identification information, MTC device SDT capability information and the MTC device group identification information;
determining, by the HSS, whether the MTC device belongs to the MTC device group or not according to the MTC device identification information and the MTC device group identification information;

when determining that the MTC device belongs to the MTC device group, determining, by the HSS, whether the MTC device has a small data sending and receiving capability or not;
when determining that the MTC device belongs to the MTC device group and has the small data sending and receiving capability, sending, by the HSS, user security configuration information and an Authentication and Key Agreement (AKA) authentication vector generated on the basis of an MTC device group key to the BSF;
performing, by the BSF, AKA authentication with the MTC device according to the received AKA authentication vector; and
after the AKA authentication between the BSF and the MTC device succeeds, generating, by the MTC device and the BSF, a root key Ks; and generating, by the MTC device, the BSF and the MTC-IWF, $K_{IWF}$ on the basis of the root key Ks in the GBA key agreement process;
wherein the method further comprises:
after at least one MTC device in the MTC device group creates a shared key $K_{IWF}$ on the basis of a root key Ks generated by the at least one MTC device and the BSF after the AKA authentication between the at least one MTC device and the BSF succeeds, and the user security configuration information is generated, in a GBA key agreement process between a further MTC device and the MTC-IWF:
performing, by the BSF, AKA vector authentication with the further MTC device according to a recently adopted authentication vector corresponding to the MTC device group identifier after determining that there is a data encryption key and/or data integrity protection key being used according to the MTC device group identification information and the user security configuration information, and after authentication succeeds, generating, by the further MTC device and the BSF, a root key Ks; and
generating, by the further MTC device, the BSF and the MTC-IWF, $K_{IWF}$ on the basis of the root key Ks in the GBA key agreement process.

7. A Bootstrapping Server Function (BSF), comprising:
a first receiving module, configured to receive an initialization request from a Machine Type Communication (MTC) device, the initialization request carrying MTC device identification information, MTC device SDT capability information and MTC device group identification information;
a retrieval request sending module, configured to, after receiving the initialization request from the MTC, send, to a Home Subscriber Server (HSS), a retrieval request carrying the MTC device identification information, MTC device SDT capability information and the MTC device group identification information;
a second Authentication and Key Agreement (AKA) authentication module, configured to perform AKA authentication with the MTC device according to an AKA authentication vector, the AKA authentication vector being generated by the HSS on the basis of an MTC device group key;
a second root key generation module, configured to, after the AKA authentication with the MTC device succeeds, generate a root key Ks with the MTC device; and
a second key agreement module, configured to perform Generic Bootstrapping Architecture (GBA) key agreement with the MTC device and an MTC Interworking Function (MTC-IWF), wherein the BSF further comprises:
a first determination module, configured to determine whether there is a shared key $K_{IWF}$ being used or not according to the MTC device group identification information and user security configuration information;
when the first determination module determines that there is $K_{IWF}$ being used according to the MTC device group identification information and the user security configuration information, the second AKA authentication module is further configured to perform AKA vector authentication with a further MTC device according to a recently adopted authentication vector corresponding to the MTC device group identifier.

8. A Bootstrapping Server Function (BSF), comprising:
a first receiving module, configured to receive an initialization request from a Machine Type Communication (MTC) device, the initialization request carrying MTC device identification information, MTC device SDT capability information and MTC device group identification information;
a retrieval request sending module, configured to, after receiving the initialization request from the MTC, send, to a Home Subscriber Server (HSS), a retrieval request carrying the MTC device identification information, MTC device SDT capability information and the MTC device group identification information;
a second Authentication and Key Agreement (AKA) authentication module, configured to perform AKA authentication with the MTC device according to an AKA authentication vector, the AKA authentication vector being generated by the HSS on the basis of an MTC device group key;
a second root key generation module, configured to, after the AKA authentication with the MTC device succeeds, generate a root key Ks with the MTC device; and
a second key agreement module, configured to perform Generic Bootstrapping Architecture (GBA) key agreement with the MTC device and an MTC Interworking Function (MTC-IWF);
wherein the BSF further comprises:
a second determination module, configured to determine whether there is a data encryption key and/or data integrity protection key being used or not according to the MTC device group identification information and user security configuration information,
when the second determination module determines that there is a data encryption key and/or data integrity protection key being used according to the MTC device group identification information and the user security configuration information, the second AKA authentication module is further configured to perform AKA vector authentication with a further MTC device according to a recently adopted authentication vector corresponding to the MTC device group identifier.

* * * * *